United States Patent [19]
Volk et al.

[11] Patent Number: 5,384,427
[45] Date of Patent: Jan. 24, 1995

[54] FLOOD PROTECTION PEDESTAL

[75] Inventors: Thomas G. Volk, Grayslake; Matthew Leschinger, Wheaton, both of Ill.; Jimmy W. Parkerson, Greenville, Miss.

[73] Assignee: Reliance Comm/Tec Corporation, Mayfield Heights, Ohio

[21] Appl. No.: 763,348

[22] Filed: Sep. 20, 1991

[51] Int. Cl.$^6$ ............................................... H02G 9/02
[52] U.S. Cl. ........................................ 174/38; 174/37
[58] Field of Search .................. 174/38, 17 R, 17 CT, 174/37, 58, 59, 60, 101; 361/369; 220/3.3, 366; 52/3, 23

[56] References Cited

U.S. PATENT DOCUMENTS

| | | | |
|---|---|---|---|
| 3,892,910 | 7/1975 | Smith | 174/37 |
| 4,097,683 | 6/1978 | Summers | 174/38 |
| 4,129,743 | 12/1978 | Lohsl | 174/38 |
| 4,631,353 | 12/1986 | Marks | 174/38 X |
| 4,661,651 | 4/1987 | Leschinger | 174/38 |
| 4,734,600 | 4/1988 | Mathis et al. | 174/87 |

OTHER PUBLICATIONS

"Cable Junction Boxes", Standard Underground Cable Co., Mar. 31, 1918 pp. 22–23.
"Bell System Practices" (G and H Cable Closures), AT&T Co., U.S.A., Jul. 3, 1969, pp. 1–27.
Reliance Comm/Tec, Product Catalog, pp. 89 and 91 of Section 5. Copyright 1991.
Coil Sales & Manufacturing Company, Advertisement. No date provided.

*Primary Examiner*—Leo P. Picard
*Assistant Examiner*—Hyung S. Sough
*Attorney, Agent, or Firm*—Trexler, Bushnell, Giangiorgi & Blackstone, Ltd.

[57] ABSTRACT

A flood protection pedestal protects telecommunications equipment and the like retained therein from water damage during flood conditions in the surrounding environment. The flood protection pedestal includes a base assembly, a structural cover assembly removably attached to the base assembly for covering the telecommunications equipment, and an air entrapping arrangement inside the cover assembly over the telecommunications equipment. The air entrapping arrangement may be either a thin walled unitary dome member integrally formed of a plastics material or a coating applied to the interior of the cover assembly. A downwardly oriented opening is formed in the dome member for receiving telecommunications equipment. A body of air is entrapped within the cover assembly when flood waters rise above a given level for protecting the telecommunications equipment from exposure to the flood waters.

7 Claims, 1 Drawing Sheet

U.S. Patent     Jan. 24, 1995     5,384,427
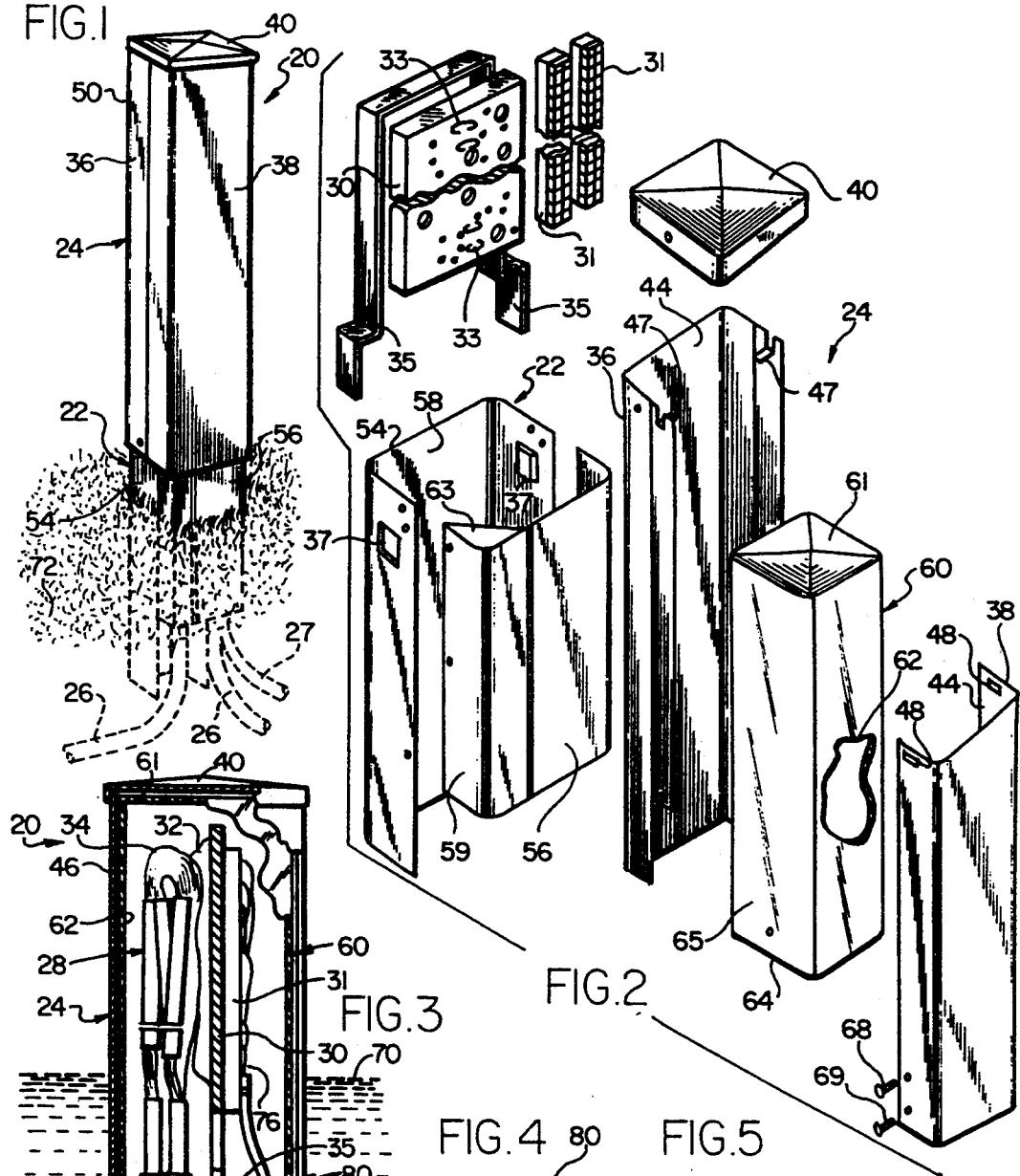

FLOOD PROTECTION PEDESTAL

BACKGROUND OF THE INVENTION

The present invention relates generally to pedestals for protecting telecommunications equipment located in an outside environment. More specifically, the present invention relates to pedestals which protect telecommunications equipment from flood or high water conditions.

Telecommunications equipment including a primary cable loop, terminal blocks, and connections between the primary cable loop and the terminal blocks are commonly located out-of-plant or outside. Such basic telecommunications equipment is necessary in applications such as branching off from a primary cable to route telecommunications lines to various end points. Since such telecommunications equipment is located outside, a protective covering is required to protect the equipment from human interference as well as the environment. Therefore, the protective covering must provide structural as well as environmental protection.

Typically, a protective structure is produced in the form of a pedestal. The pedestal structure provides a sufficient volume in a minimum area and in a convenient working orientation for housing telecommunications equipment. A base assembly of the pedestal is recessed and secured in the ground and has a passageway to permit a cable to extend therethrough. The cable is covered by a cover portion which attaches to the base portion. The pedestal should have sufficient structural strength to resist minor impacts as well as other environmental conditions such as wind, snow accumulation or precipitation impact.

A problem arises with typical commercially available pedestals in that they do not protect the telecommunications equipment retained therein from flood water conditions. In other words, these pedestal arrangements do not protect the telecommunications equipment when water in the surrounding environment rises above the level of the telecommunications equipment retained inside of the pedestal. A reason for this problem is that the cover portions of many commercially available pedestals permit water to rise inside of their cover portions.

One form of commercially available pedestal is an assembly employing a thick walled rigid plastic tube. This assembly is referred to as the "PEDLOCK®" produced by Coil Sales and Manufacturing Company, a Charles Industries Company, located in Rolling Meadows, Ill. The PEDLOCK® device simply uses a rigid PVC plastic tube to house the telecommunications equipment. The base portion of the pedestal is of a first diameter and the cover portion is of a second diameter which is greater than the base diameter. The cover portion telescopes over the base portion and locks thereon covering the telecommunications equipment projecting through the base portion. The cover portion tube is closed at one end to create a "bell jar" effect which traps a quantity of air therein as the water level rises, thus limiting the height to which water may rise therewithin and protecting the telecommunications equipment within the air bubble trapped inside.

While the PEDLOCK® device protects telecommunications equipment, such a device is not cost effective in many instances due to the expense of fabricating a sufficiently large and thick-walled plastic structure of a material such as PVC which has both the waterproof characteristics and the structural characteristics to serve as a telecommunications protection pedestal. Further, since the base portion is also a continuous tube formed of plastic it is difficult to thread a large multi-pair cable through the base which increases worker time and expense and also the risk of damage to the cable. Additionally, the all-plastic PEDLOCK® device requires a separate grounding assembly in order to provide the necessary ground circuits for the telecommunications equipment and lines retained therein. Finally, since the PEDLOCK® device is formed of a thick walled PVC plastic, if the device becomes damaged it can be quite expensive to replace the device.

OBJECT AND SUMMARY OF THE INVENTION

A general object of the present invention is to provide a flood protection pedestal which protects telecommunications equipment from exposure to flood waters in the surrounding environment, is more cost effective, and avoids the above-noted problems of the prior art.

A more specific object of the present invention is to provide a flood protection pedestal which provides a bell jar effect to protect telecommunications equipment from water and yet provides the necessary structural integrity, support and environmental protection.

Yet another object of the present invention is to provide a flood protection pedestal which has a base assembly configured for facilitating installation of telecommunications equipment therein, including multi-pair cable bundles.

Briefly and in accordance with the foregoing objects, the present invention comprises a flood protection pedestal for protecting telecommunications equipment and the like retained therein from water damage during flood conditions in the surrounding environment. The flood protection pedestal includes a base assembly, a structural cover assembly removably attached to the base assembly covering the telecommunications equipment, and an air trapping portion positioned inside the cover assembly and over the telecommunications equipment. A body of air is entrapped in the air trapping portion when water rises above the downwardly oriented opening to protect the telecommunications equipment from exposure to the flood waters.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawing in which like reference numerals identify like elements, and in which:

FIG. 1 is a perspective view of a flood protection pedestal of the present invention installed in an operating environment;

FIG. 2 is an exploded perspective view of the flood protection pedestal as illustrated in FIG. 1;

FIG. 3 is a partial cross sectional side elevation of the flood protection pedestal;

FIG. 4 is an enlarged detail view of the cross section of the flood protection pedestal as illustrated in FIG. 3; and FIG. 5 is an enlarged detail view of a cross section of an alternative embodiment of the flood protection pedestal similar to that as illustrated in FIG. 4 in which an air trapping portion is formed by a coating applied to an interior surface of the cover assembly.

DETAILED DESCRIPTION OF THE ILLUSTRATED EMBODIMENT

While the invention may be susceptible to embodiment in different forms, there is shown in the drawings, and will be described in detail herein, a specific embodiment of the present invention with the understanding that the present disclosure is to be considered an exemplification of the principles of the invention, and is not intended to limit the invention to that as illustrated and described herein.

Referring now to the drawings, wherein like parts are designated by the same reference numerals throughout the figures, a flood protection pedestal 20 is shown in FIG. 1. The flood protection pedestal 20 is installed with a base assembly 22 recessed into a pit or trench in the ground and a rigid cover assembly 24 is removably attached to the base assembly 22. A buried-multi-pair primary cable 26 is shown in phantom line extending upwardly from below the flood protection pedestal 20 through the base assembly 22.

With reference to FIG. 3, telecommunications equipment 28 is retained inside of the flood protection pedestal 20. The telecommunications equipment 28 includes a backboard or bracket 30 for mounting one or more terminal blocks 31 and other cable, routing hardware 33 (shown in FIG. 2) to which connections 32 are made between conductors in a looped portion 34 of the multi-pair primary cable 26 and a service cable 27 for connection to subscriber equipment. The backboard 30 is mounted on a frame member which optionally serves as a splice support member with downwardly extending legs 35 which engage cooperatively dimensioned pockets 37 formed in the corresponding sides of a rear base panel 54.

An exploded view of the flood protection pedestal 20 is illustrated in FIG. 2. As shown, the rigid cover assembly 24 includes a rear cover panel 36, a front cover panel 38, and a cap member 40. Each of the front and rear panels 38, 36 are formed as a U-shaped channel 44 so that when the panels 38, 36 are cooperatively assembled, the respective channels 44 form a cover cavity 46 (see FIG. 3). A tab 47 formed along the top edge of the rear panel 36 and directed inwardly towards the U-shaped channel 44 engages a notch 48 cooperatively formed along the top edge of the front panel 38. When the front and rear panels 38, 36 are assembled, the cap member 40 is positioned over an upwardly disposed end 50 thereof. An open end or a mouth 52 of the cover assembly 20, distal the cap member 40, provides access to the cover cavity 46.

The base assembly 22 includes a rear base panel 54 and a cooperative front base panel 56. When assembled, the front and rear base panels 56, 54 form a base passageway 58 through which the multi-pair primary cable 26 passes. Disassembly of the front base panel 56 from the rear base panel 54 facilitates the installation of the multi-pair primary cable 26 therein. The two-piece assembly of the base panels 54, 56 eliminates the need to thread the primary cable 26 through the base passageway 58 thereby increasing the ease of installation of the primary cable 26.

A hinged service wire channel cover or hinge a cover 59 cuts across one corner of the front base panel 56. The hinged cover 59, as shown, is a generally triangular shaped member and forms a service wire channel 63 with the front base panel 56. The hinged cover 59 facilitates craft separation by permitting the entire pedestal to be installed before connection of the service wire 27. The service wire 27 can be connected to and routed from the pedestal without having to disturb the base portion 22.

The bracket 30 is attachable to the rear base panel 54 so that terminal blocks and cable routing hardware, as well as telecommunications equipment 28 attached thereto are supported even if the front base panel 56 is removed. Further, attachment of the bracket 30 to the base assembly 22 permits 360° access to the telecommunications equipment 28 attached thereto when the cover assembly 24 is removed therefrom.

The base assembly 22, rear panel 36, front panel 38, and cap member 40 are formed of a suitable metal to provide sufficient structural rigidity and mechanical strength to protect the telecommunications equipment 28 from adverse conditions which may occur in the installed environment. The two-piece assembly of the base assembly 22 and of the cover assembly 24 permit the front and rear base panels 56, 54 and the front and rear cover panels 38, 36 to be formed of metal sheet stock thereby eliminating the need for costly heavy walled plastic parts. Further, multi-component assembly of the base assembly 22 and the cover assembly 24 permits ease of replacement should only one panel of the many panels become damaged.

While the cover assembly 24 and the base assembly 22 provide the flood pedestal 20 with mechanical strength, an air trapping, waterproof dome member or liner 60 positioned between the cover assembly 24 and the equipment protects the telecommunications equipment retained thereunder from moisture and flooding in the surrounding installation environment. The double walled construction of the combined cover assembly 24 and the liner 60 help also to control the formation of condensation on the inside of the liner 60.

As shown in FIG. 4, the dome member 60 is a thin walled unitary member integrally formed of a suitable plastic material. The dome member 60 is formed with an integral closed top 61 and a downwardly oriented open end 64. A dome cavity 62 thus defined is substantially co-extensive with the cover cavity 46 and is accessed through open end 64. As shown in FIG. 4, the walls 65 of the dome member 60 have a generally continuous thickness 66, preferably of substantially on the order of 0.050 inches. Examples of a suitable material used to form the dome member 60 include polypropylene, PVC or a high density polyethylene (HDPE).

As shown in FIG. 5, in an alternative embodiment, the air trapping function of the dome member 60 is performed by a suitable coating 60a applied to an interior surface of the cover cavity 46. The coating 60a may be applied by a spray method and once cured, set, or dried, cannot be permeated by air. Preferably, the coating 60a generally ranges in thickness from 0.015"–0.020" in order to achieve the same air trapping, bell-jar effect as the dome member 60, as further described hereinbelow. Advantageously, the provision of either dome 60 or coating 60a provides additional environmental protection and flood protection in a very economical fashion.

In order to facilitate the removal of the cover assembly 24, the dome member 60 is attached to the cover assembly 24 by means of a fastener member 68 such as a rivet. This arrangement permits the cover assembly 24 and dome 60 to be removed and replaced as a single component, minimizing work steps in both the assembly as well as the disassembly and reassembly of the cover assembly 24 and dome 60. The cover assembly 24 is removably attachable to the base assembly 22 by means of a removable fastener 69 attached therebetween. A releasable self-locking mechanism operated by industry standard tools may be used for this fastener. The fastener 69 may be of tamper resistant design for added protection of the contents of the pedestal 20.

FIG. 3 provides a cross-sectional view of the flood protection pedestal under conditions during which the surrounding environment is experiencing flood conditions. As shown in FIG. 3, although the surrounding water level 70 has risen substantially above the ground 72 a water level 74 inside of the flood pedestal 20 stays below the telecommunications equipment 28. The dome member 60 protects the telecommunications equipment 28 by entrapping a body of air 76 in the dome cavity 62 by a "bell jar" type effect. Generally, the telecommunications equipment 28 is positioned high enough above the downwardly oriented opening 64 of the dome member 60 to prevent contact with the flood water inside of the flood protection pedestal 20.

The bracket 30 is also attached to the base assembly 22 by a grounding assembly 78. The grounding assembly 78 grounds the telecommunications equipment 28 directly to the metallic base assembly 22 thereby providing a common point for electrical connection of all grounds. Cable shields are connected to the grounding assembly by wire conductors.

In use, the rear base panel 54 is installed in the ground 72 and the primary cable 26 is formed into loop 34 and positioned therein. The front panel 56 is cooperatively attached to the rear panel 54 to retain the primary cable 26 therebetween with loop 34 projecting. The bracket 30 with terminal block 31 and cable routing hardware 33 is attached to the base assembly 22 and connections are made between the desired wires of primary cable 26 a service cable 27. The pre-assembled rear and front panels 36, 38 are cooperatively attached to form a tubular sleeve to which the cap member 40 is attached to cover one end thereof. The unitary dome member 60 is inserted through the open end 52 of the assembled cover 24.

The assembled cover assembly 24 and dome 60 are positioned over the telecommunications equipment 28 extending upwardly from the base assembly 22 and fastener 69 is employed for removably engaging the base 22 with cover 24 and dome 60. The rigid construction of the cover assembly 24 and the base assembly 22 provides structural integrity and protects the telecommunications equipment. Such structural strength is important to protect from unintended impacts which may result from activities and factors in the environs around the pedestal such as construction activity, sporting activities and gunfire.

During high water conditions, a body of air 76 is entrapped in the dome member 60 to protect the telecommunications equipment 28 from water infiltration during the high water or flood conditions. The dome 60 also provides some further protection for the equipment against moisture, dirt and other environmental contaminants. The double wall construction of cover 24 and dome 60 may also offer condensation control. An air space 80, as shown in FIGS. 3 and 4, between the dome 60 and the cover 24 provides an insulating layer to help prevent condensation formation and build-up inside the dome 60 and thus further protect the contents of the dome 60 from the detrimental effects of moisture.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention claimed is:

1. A flood protection pedestal for protecting telecommunications equipment and the like retained therein from water damage during flood conditions in the surrounding environment, said flood protection pedestal comprising: a hollow, open ended base assembly; an axially elongated damage-resistant, heavy gauge structural cover assembly having an open end, said cover assembly being removably attached to said base assembly; a rigid light gauge thin-walled air trapping unitary liner separate and independent from said cover assembly positioned between said damage-resistant cover assembly and telecommunications equipment to be retained within said damage-resistant cover assembly, said rigid thin-walled unitary liner being integrally formed of plastics material and having external dimensions and shape substantially similar to the internal dimensions and shape of said damage resistant structural cover assembly for interfitting closely spaced inside an inner surface of said cover assembly a single opening in said rigid thin-walled unitary liner substantially coincident with said open end of said cover assembly for receiving telecommunications equipment therethrough, said open end of said unitary liner communicating with the ambient atmosphere, said rigid thin-walled unitary liner entrapping a body of air from said ambient atmosphere when water rises above the opening for protecting telecommunications equipment retained therein.

2. A flood protection pedestal according to claim 1 wherein said base assembly and said cover assembly are formed of a conductive material and further including a grounding assembly for coupling to telecommunications equipment and said base assembly for grounding telecommunications equipment when retained in said flood protection pedestal.

3. A flood protection pedestal according to claim 1 further including a narrow air space between said damage-resistant structural cover assembly and said thin-walled unitary liner for insulating said pedestal to deter condensation formation inside of said thin-walled unitary liner to further protect the contents thereof from moisture.

4. A flood protection pedestal according to claim 1 wherein said base assembly includes a base front panel removably engageable with a base rear panel, and defining a base passageway therebetween, said base front panel being removable from said base rear panel for facilitating placement of telecommunications equipment including multi-pair cables into and through said base passageway.

5. A flood protection pedestal according to claim 4 wherein said cover assembly includes a damage-resistant cover front panel and a damage-resistant cover rear panel, the cover front and rear panels defining a cover cavity therein, a cap member attachable to the cover front and rear panels for covering one end of said cover cavity, an opposite end of said cover cavity distal said cap member being open and downwardly disposed and disposable over telecommunications equipment for engagement with said base assembly.

6. A flood protection pedestal according to claim 1 wherein said plastics material comprises a high density polyethylene.

7. A flood protection pedestal according to claim 1 wherein the walls of said thin-walled unitary liner have a thickness dimension of approximately 0.050 inches.

* * * * *